(12) United States Patent
Koetz

(10) Patent No.: US 9,968,221 B2
(45) Date of Patent: May 15, 2018

(54) FOOD PROCESSOR WITH A FACE RECOGNITION SOFTWARE

(71) Applicant: Vorwerk & Co. Interholding GmbH, Wuppertal (DE)

(72) Inventor: Hendrik Koetz, Witten (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 256 days.

(21) Appl. No.: 14/647,479

(22) PCT Filed: Nov. 27, 2013

(86) PCT No.: PCT/EP2013/074807
§ 371 (c)(1),
(2) Date: May 27, 2015

(87) PCT Pub. No.: WO2014/083029
PCT Pub. Date: Jun. 5, 2014

(65) Prior Publication Data
US 2015/0305566 A1  Oct. 29, 2015

(30) Foreign Application Priority Data

Nov. 29, 2012  (DE) .................... 10 2012 111 602

(51) Int. Cl.
*A47J 43/07* (2006.01)
*B01F 15/00* (2006.01)
*B01F 15/06* (2006.01)

(52) U.S. Cl.
CPC .......... *A47J 43/07* (2013.01); *A47J 43/0716* (2013.01); *A47J 43/0761* (2013.01); *B01F 15/00* (2013.01);
(Continued)

(58) Field of Classification Search
CPC .... A47J 43/07; A47J 43/0716; A47J 43/0761; B01F 15/00; B01F 15/00279
(Continued)

(56) References Cited

U.S. PATENT DOCUMENTS 2,815,193 A  12/1957 Brown
3,943,421 A  3/1976 Shibata et al.
(Continued)

FOREIGN PATENT DOCUMENTS

CN  202051534 U  11/2011
DE  10 2007 059 236 A1  6/2009
(Continued)

OTHER PUBLICATIONS

International Search Report of PCT/EP2013/074797, dated Mar. 17, 2014.
(Continued)

*Primary Examiner* — Charles Cooley
*Assistant Examiner* — Marc C Howell
(74) *Attorney, Agent, or Firm* — Collard & Roe, P.C.

(57) ABSTRACT

An electrically operated food processor with a mixing bowl and a mixer in the mixing bowl, wherein the mixing bowl can be heated, is provided with a camera, in particular an electronic camera, which is potentially directed towards the user of the food processor, and with stored face recognition software, as well as a face data bank, it being possible to use face recognition to cause the food processor to carry out a routine task.

16 Claims, 3 Drawing Sheets

(52) U.S. Cl.
 CPC .. *B01F 15/00279* (2013.01); *B01F 2015/062* (2013.01); *B01F 2215/0014* (2013.01)

(58) Field of Classification Search
 USPC .................................................. 366/145, 206
 See application file for complete search history.

(56) References Cited

U.S. PATENT DOCUMENTS

| | | | |
|---|---|---|---|
| 5,156,867 | A | 10/1992 | Leuthold et al. |
| 5,267,211 | A | 11/1993 | Kobayashi et al. |
| 5,556,198 | A | 9/1996 | Dickson, Jr. et al. |
| 6,072,494 | A | 6/2000 | Nguyen |
| 6,243,683 | B1 | 6/2001 | Peters |
| 6,246,683 | B1 | 6/2001 | Connery et al. |
| 6,587,739 | B1 | 7/2003 | Abrams et al. |
| 6,728,343 | B1 | 4/2004 | Taylor et al. |
| 6,759,072 | B1 | 7/2004 | Gutwein et al. |
| 2002/0009016 | A1 | 1/2002 | Ancona et al. |
| 2002/0009017 | A1 | 1/2002 | Kolar et al. |
| 2002/0167861 | A1 | 11/2002 | Barton et al. |
| 2002/0176320 | A1 | 11/2002 | Wulf et al. |
| 2004/0203387 | A1 | 10/2004 | Grannan |
| 2004/0267382 | A1 | 12/2004 | Cunningham et al. |
| 2005/0068846 | A1 | 3/2005 | Wulf et al. |
| 2005/0196046 | A1 | 9/2005 | Hudnut et al. |
| 2007/0081696 | A1* | 4/2007 | Brennan ............ G07C 9/00158 382/115 |
| 2008/0225636 | A1 | 9/2008 | Kolar |
| 2010/0061181 | A1 | 3/2010 | Malackowski et al. |
| 2010/0270285 | A1 | 10/2010 | Qian et al. |
| 2011/0029314 | A1* | 2/2011 | Lin .................... A21C 15/002 704/270 |
| 2011/0149677 | A1 | 6/2011 | Davis et al. |
| 2011/0187640 | A1 | 8/2011 | Jacobsen et al. |
| 2011/0230238 | A1 | 9/2011 | Aronsson et al. |
| 2011/0312311 | A1 | 12/2011 | Abifaker et al. |
| 2012/0111798 | A1 | 5/2012 | Mundheim Ylikangas |
| 2012/0151420 | A1 | 6/2012 | Amento et al. |
| 2012/0154108 | A1 | 6/2012 | Sugaya |
| 2012/0206603 | A1* | 8/2012 | Rekimto ............ G06K 9/00308 348/156 |
| 2012/0220338 | A1 | 8/2012 | Degrazia et al. |
| 2013/0003490 | A1* | 1/2013 | Kemker ................ A47J 27/62 366/142 |
| 2013/0021459 | A1* | 1/2013 | Vasilieff .................. G10L 25/78 348/77 |
| 2014/0168062 | A1* | 6/2014 | Katz ........................ G06F 3/017 345/156 |
| 2014/0269154 | A1 | 9/2014 | Kolar et al. |
| 2015/0117137 | A1 | 4/2015 | Haney et al. |
| 2015/0279370 | A1 | 10/2015 | Koetz |
| 2015/0305564 | A1 | 10/2015 | Jimenez et al. |
| 2015/0305567 | A1 | 10/2015 | Koetz |
| 2016/0241653 | A1 | 8/2016 | Ciepiel |
| 2016/0249771 | A1 | 9/2016 | Van Der Gaag et al. |

FOREIGN PATENT DOCUMENTS

| | | | |
|---|---|---|---|
| DE | 10 2010 060 650 A1 | 5/2011 | |
| EP | 1 561 409 A1 | 8/2005 | |
| TW | M441164 U1 | 11/2012 | |
| WO | WO 2011064145 A1 * | 6/2011 | ............ A47J 27/62 |
| WO | 2011/106350 A2 | 9/2011 | |

OTHER PUBLICATIONS

International Search Report of PCT/EP2013/074807, dated Mar. 25, 2014.
International Search Report of PCT/EP2013/074798, dated Mar. 25, 2014.
Internet Archive Web Page: https://web.archive.org/web/20081019000620/http://www.plasma2002.com/blenderdefender/ as found archived on Oct. 19, 2008, 11 pages, Retrieved on Jan. 6, 2017.

* cited by examiner

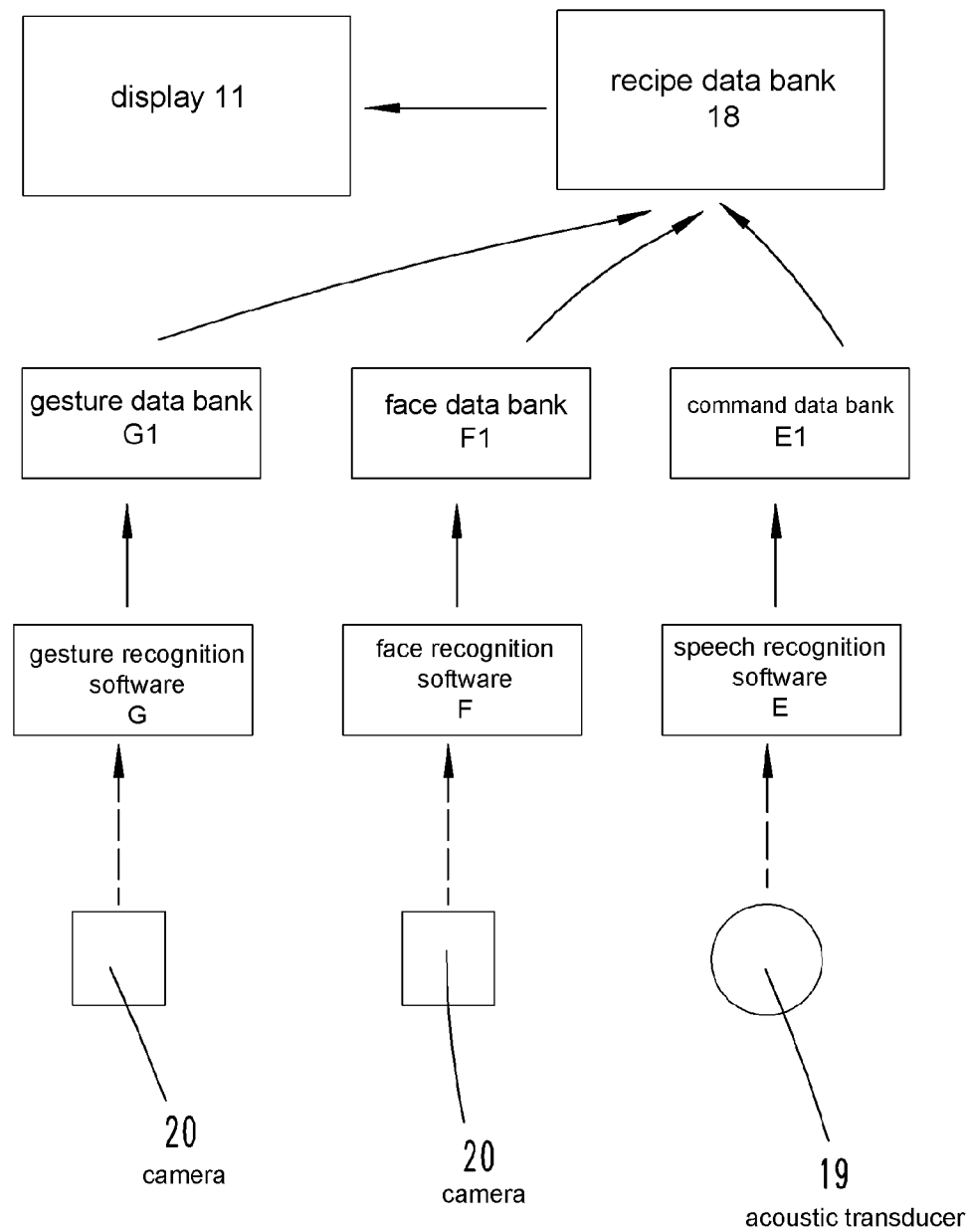

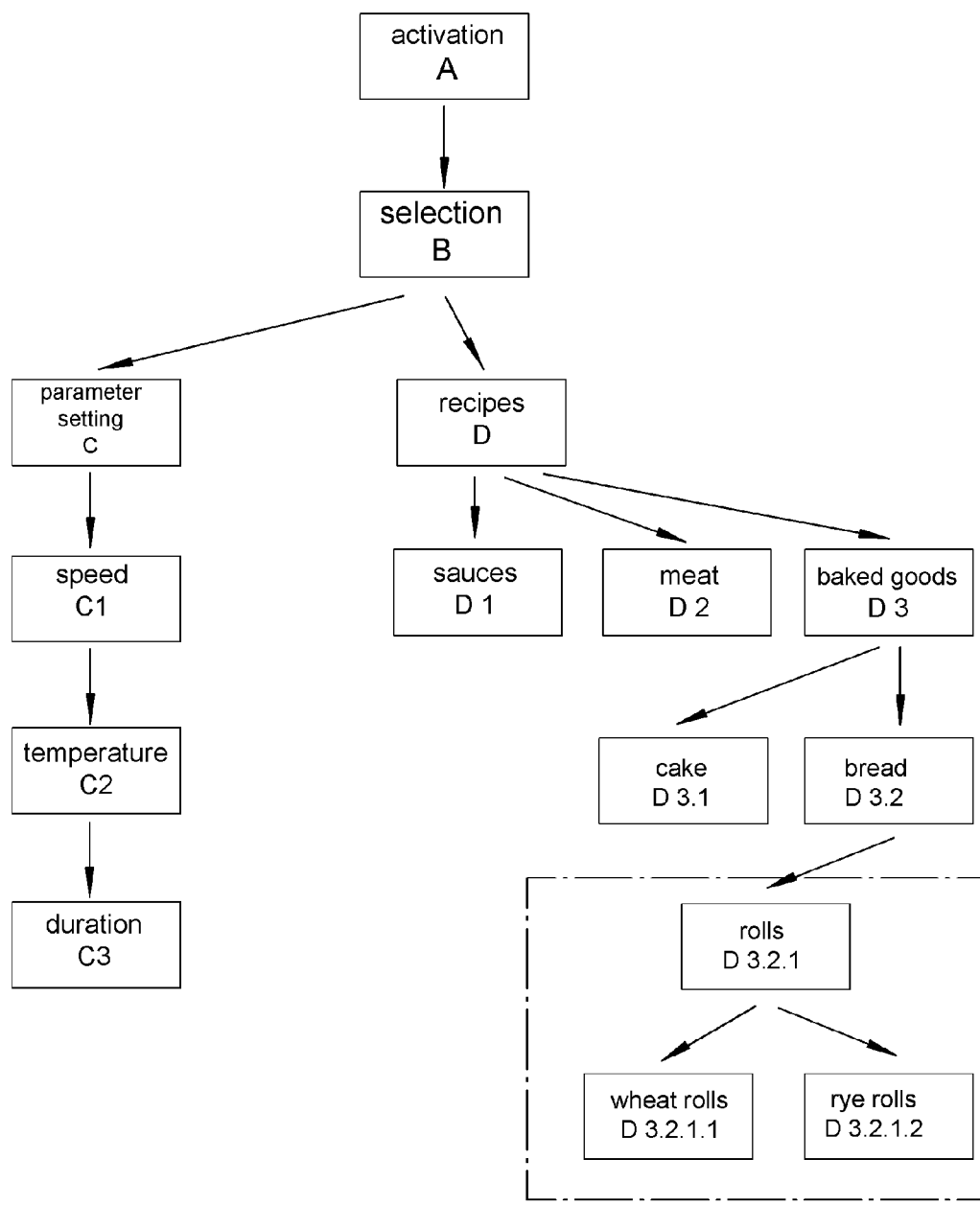

FOOD PROCESSOR WITH A FACE RECOGNITION SOFTWARE

CROSS REFERENCE TO RELATED APPLICATIONS

This application is the National Stage of PCT/EP2013/074807 filed on Nov. 27, 2013, which claims priority under 35 U.S.C. § 119 of German Application No. 10 2012 111 602.4 filed on Nov. 29, 2012, the disclosure of which is incorporated by reference. The international application under PCT article 21(2) was not published in English.

The invention relates to an electrically operated food processor with a mixing bowl and a mixer in the mixing bowl.

Food processors of the type in question are known, for example from DE 102007059236 A1. The processing of food is possible by means of such food processors, the cooking of dishes is furthermore possible in the case of heatable mixing bowls, for the purpose of which in particular the heating power, which acts on the mixing bowl or on the content of the mixing bowl, respectively, can preferably be controlled by the user, and preferably also the direction of rotation and the rotary speed of the mixer in the mixing bowl, furthermore also the duration of the impact of heater and/or mixer, if applicable.

It is furthermore known to set in particular the above-mentioned parameters of the food processor at the food processor by means of electrical or electronic, respectively, or mechanical setting means, for example by means of rotary switches or push buttons. It is also known in this context to assign a preferably non-volatile memory, which offers a recipe selection, to the food processor. Such a recipe selection can preferably be displayed and selected on a display of the food processor. With regard thereto, reference is made to DE 102009055794 A1 or also to DE 102010060650 A1.

If the user selects a recipe stored in the food processor, preferably the parameters, which are to be set, such as temperature, mixer speed and duration of the program, if applicable, are provided and, if applicable, are set independently after confirmation by the user; they can furthermore be changed by the user, if applicable.

Based on the known state of the art, the invention deals with the task of specifying a food processor, which is advantageous with regard to the implementation or use.

A possible solution of the task according to a first idea of the invention is at hand in the case of a food processor, which focuses on the food processor encompassing a camera, in particular an electronic camera, which is potentially directed towards the user of the food processor, and that a face recognition software as well as a face data bank are stored and that it is possible to use face recognition to cause the food processor to carry out a routine task.

If the food processor has identified a user by means of the face recognition, the food processor can greet the user (initially), for example. A name can also be assigned to a face, which is stored in the face data bank. The greeting can take place according to the use of the name of the recognized user.

The greeting can consist of a word sequence, which appears on a display. The greeting can also take place by means of speech output. The greeting can also take place by means of acoustic signals, for example a tone sequence.

The identification of a user by means of the face recognition can be used such that recipes, which are chosen from an available recipe data bank and which are marked by the identified user, thus preferably recipes, to be output as recipe proposals—at least primarily. The recipe data bank can also be adapted to the identified user. For instance, the food processor can provide recipe suggestions, which are personalized for the identified user, for example in the form of the last five accessed recipes, in particular of the last five recipes accessed by the identified user and/or in the form of a list comprising favorite recipes, which was previously defined by the identified user or with regard to the identified user.

Independent from or in addition to the face recognition, the time of day can also be considered with regard to the recipe suggestions from the food processor. In the evening, recipes which differ from those in the morning or at lunchtime, can be proposed.

With regard to an identified user, recipe suggestions can also be made, which offer dietary suggestions and/or medically prescribed recipe components. For instance, an input, which assigns a dietary suggestion and/or medically prescribed recipe portions to a certain user, can be made beforehand. Ingredients, which a respective user should not use or is not allowed to use, for example, can also be identified in the recipe data bank or in a further data bank, which is connected thereto for evaluation by being stored therein. It is thus possible, for example, to output only recipe suggestions, in which these ingredients are not used.

An image is captured continuously by means of the camera, which is installed in the food processor and which is preferably directed towards the common position of the user relative to the food processor. If a user is located in a defined image section and at a defined distance in front of the device—preferably between 0.4 and 2 m, more preferably approximately 1 m—the image is examined, the face is extracted and is compared to a previously generated face data bank. The recording is preferably made by means of a common VGA camera.

The comparison of a recording made by means of the camera and the corresponding data stored in the face data bank is attained by means of a processor, which is integrated in the food processor, wherein the face data bank is preferably further stored in a non-volatile memory of the device.

It is not necessary for the mentioned data, in particular the face data bank, to be stored in the food processor itself. It can also be stored in a memory, which can be connected to the food processor, for instance in the form of a USB flash drive, which can be connected to the food processor. It can also be stored in a memory, which can be in radio contact or which can come in radio contact with the food processor and which can be located in its own computer or also in a device for a mobile telephone. The same applies to the evaluation software.

Further features of the invention will be explained below, also in the figure description, often in their preferred assignment to a first embodiment or to features of further embodiments. However, they can also be significant in an assignment to only individual features of the first embodiment or of the respective further embodiments or in each case independently.

Provision is thus made in a more preferable embodiment for the activation of the food processor to take place by means of the face recognition, so that the food processor can only be used with its functions with the recognition of a face, which is present in the face data bank, and which might furthermore be marked. In a preferred embodiment, the manual operation of the food processor, that is, the operation of the individual setting elements, such as speed, temperature and duration setting element, is only possible when a face of an authorized person is recognized.

Associated with the faces in the face data bank, individual functions of the food processor can also be limited or deactivated, whereas other functions can be activated, for example, so as to allow for a limited use of the food processor.

In addition, provision is made in a further preferred embodiment for the activation of a speech control and/or of a gesture control of the food processor to take place by means of the face recognition. The face recognition, hereby preferably in the form of an access code for the food processor, serves to control the food processor solely by means of speech or gesture, if applicable, after being activated.

It is also preferred for the face recognition to be activated when the food processor is turned on. When activating the food processor, for example as a result of operating a main switch or plugging a power plug into the power socket of the power supply of the house, the food processor is preferably in a so-called stand-by mode, in which the face recognition is activated at the same time.

In the alternative, the face recognition, in particular from a stand-by mode of the food processor, is only activated after a command input. In a preferred embodiment, this command input can be attained by operating a setting element of the food processor, for example a push button or switch. This command input can also take place via a preferably bidirectional speech control.

It is also preferred for the face recognition to be capable of being deactivated only by turning off the food processor, for example as a result of an operation of the main switch into an off position of by unplugging the power supply on the mains side.

In a more preferable embodiment, a heating and/or a running of the mixer is only carried out, if speed, temperature and duration are provided or are accepted in response to a corresponding proposal by the food processor. This means that in one case, the user must specify values for all three parameters, thus in particular for the speed, the temperature and the duration. The order can be provided hereby or can be queried successively, respectively, by a speech output of the food processor.

In the alternative, in particular in response to using a stored recipe, which was preferably accessed by recognition of a known face, an acoustic output of the parameters, such as speed, temperature and duration, which were set independently according to the recipe, can be confirmed by the user via the food processor, for example via speech input.

The software evaluation described above and below does not need to be made in the food processor. It can also be carried out, for example by means of radio contact to a computer located outside of the food processor or hand-held unit, such as a mobile telephone, for instance. It can also be carried out in a spatially remote computer ("cloud").

The invention will be explained below by means of the enclosed drawing, which, however, represents only an exemplary embodiment.

FIG. 2 shows a schematic illustration of the recognition software and data banks stored in the food processor 1 to control the latter;

FIG. 3 shows a flowchart for illustrating an exemplary operation of the food processor.

Figure 1:
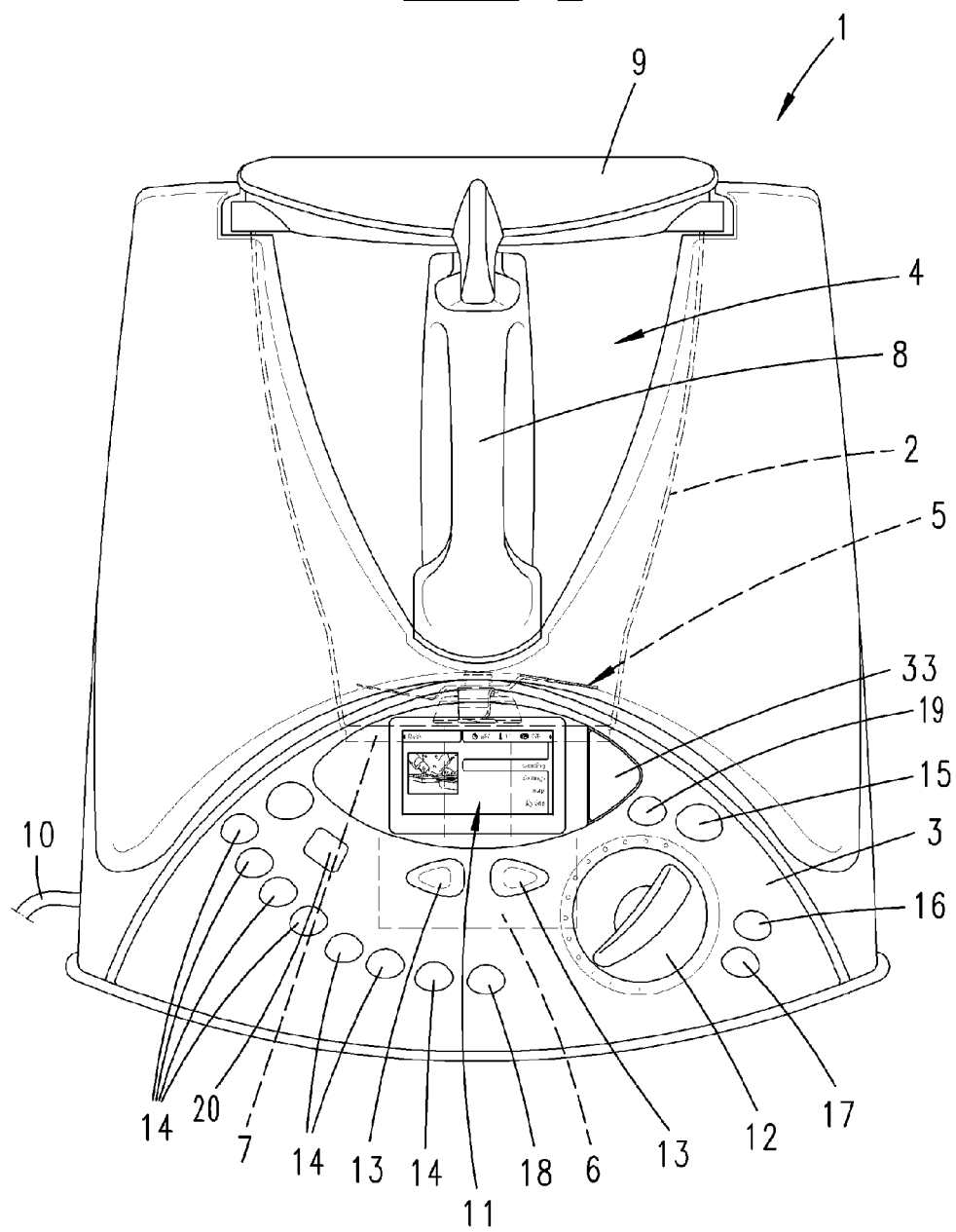
FIG. 1 shows a view of a food processor of the type in question with a mixing bowl accommodated in a mixing bowl accommodation, mechanical switches for setting variables as well as a display.

A food processor 1 with a mixing bowl accommodation 2 and a control panel 3 is illustrated and described initially with regard to FIG. 1.

A mixing bowl 4 can be assigned to the food processor 1, in that said mixing bowl is inserted into the mixing bowl accommodation 2, in particular in the base area of the mixing bowl 4, preferably with positive locking. Assigned to the mixing bowl bottom, provision is made in the mixing bowl 4 for a mixer 5, which is operated via an electric motor 6, which is arranged in the food processor 1 below the mixing bowl accommodation 2 and which is only illustrated schematically in the drawing. The mixer 5 remains in the mixing bowl 4 even if the latter is removed from the mixing bowl accommodation 2, for the purpose of which, in a more preferable manner, the mixer 5 is connected to the electric motor 6 via a torque proof plug-in coupling in the assigned position.

The bottom of the mixing bowl 4 can preferably be heated to heat a food to be cooked, which is located in the mixing bowl 4. Preferably, an electrical resistance heating 7, which is integrated in the bottom of the mixing bowl 4, is used here.

The mixing bowl 4 is preferably embodied in a pot-like manner comprising a substantially circular cross section, with a cross section, which widens conically to the pot opening, that is, towards the top. The pot wall preferably consists of a metal material.

The mixing bowl 4 furthermore encompasses a grab handle 8, which is preferably oriented vertically and which is fixed to the mixing bowl 4, for example on the base side as well as on the side of the pot edge.

The mixing bowl 4 is preferably assigned to the food processor 1 such that the grab handle 8 extends in a free-standing manner between device housing brackets, facing the control panel 3, wherein the base area of the mixing bowl 4 is supported on an integral bottom of the food processor 1 in the area of the accommodation 2, by coupling mixer drive and mixer 5 and preferably by electrically contacting the heater on the side of the mixing bowl bottom.

A bowl lid 9 can be attached to the mixing bowl 4. During operation of the food processor 1, further in particular during operation of the mixer 5 and/or of the resistance heating 7 on the bottom side, said bowl lid is locked in an attached position, more preferably to the housing of the food processor 1. Centrally, the bowl lid 9 has a non-illustrated filler opening.

The electric supply of the electric motor 6 as well as of the heater 7, which is more preferably provided on the side of the mixing bowl bottom, and furthermore also of the electrical control of the entire food processor 1 is attained via a power cord 10.

Initially, provision is preferably made in the control panel 3 for a display 11. More preferably, the control panel 3 supports one or a plurality of mechanical switches and controllers for setting different variables for the operation of the food processor 1. Initially, provision is thus preferably made for a rotary switch 12 for setting the speed of the mixer 5, whereby mixer speed stages are preferably selected via the rotary switch 12, and a provided mixer speed is assigned to each mixer speed stage.

Provision is made in the illustrated exemplary embodiment for two further mechanical switches in the form of push buttons 13, preferably below the display 11. With this, a duration can be input as variable, via which duration preferably the mixer 5 and/or the heater 7 of the mixing bowl 4 on the bottom side is activated.

In addition, provision can be made for a number of mechanical switches in the form of push buttons 14, via which different, provided temperatures can be selected. Preferably, these are temperatures in the range of from 37° C. to 100° C. By means of the chosen temperature and the mixer speed, which is chosen via the rotary switch 12, if applicable, heat is applied to the food to be cooked, which is located in the mixing bowl 4, for a period, which is provided by means of the push buttons 13.

In addition, provision can furthermore be made in the control panel 3 for further push buttons for recalling stored special functions, thus in particular a push button 15 for activating a turbo function, in response to which the mixer 5 is operated at a maximum speed for a short time, that is, preferably for a period of between 1 and 3 seconds, more preferably for a period, which corresponds to the period during which the push button is acted upon. More preferably, the turbo function thus leads to a temporary speed of the mixer 5 of more than 10.000 rpm, more preferably more than 12.000 rpm, up to 15.000 rpm, for example.

A further push button 16 preferably serves to activate a direction reversal function for the mixer 5. If, during normal operation, the mixer 5 preferably rotates clockwise, the push button 16 provides for the switchover to counter-clockwise. The new direction of rotation can be maintained until the period specified via the push buttons 13 has expired. More preferably, the electronics of the food processor 1 (then) switches back into the standard direction of rotation independently. It is also possible to reverse the direction of rotation again by operating the push button 16 during the mixer operation again.

Provision is preferably furthermore made for a push button 17 for activating a dough mixing function, which is used in particular when making heavy yeast and bread doughs.

The variables, which are to be set via the rotary switch 12 as well as via the push buttons 13 to 17 or the functions, which are to be accessed, respectively, can preferably be displayed in the display 11.

A recipe data bank 18 is more preferably stored in the food processor 1. This recipe data bank includes a plurality of recipes for preparation in the food processor 1, preferably in a categorized manner. Preferably the parameters or variables, respectively, relating to the speed of the mixer 5, temperature of the resistance heating 7 and duration are assigned to each recipe. Preferably, the food processor 1 sets these variables independently or provides them to the user for confirmation with the activation of the recipe process.

In addition, users or user groups, for example, can be assigned to each recipe, so that every user of the food processor 1 can access his preferred recipes at the touch of a button, so to speak, without moving through the menu in a time-consuming manner. The latter is preferably displayed on the display 11 in the conventional manner. In one embodiment, said display 11 can be embodied as touchscreen.

In addition and parallel to an operation via an acoustic signal, the food processor 1 can preferably also be operated manually in the conventional manner, thus in particular as a result of operating rotary switch 12 and push buttons 13 to 17.

Preferably, the food processor 1 is activated initially for operation, more preferably solely by one or a plurality of authorized persons.

The authorization proof for activating the food processor and for activating the operating functions of the food processor is preferably attained by means of a speech control and/or a gesture control and/or a face recognition.

For this purpose, the food processor 1 more preferably encompasses a speech recognition software E and/or a face recognition software F and/or a gesture recognition software G. An acoustic transducer 19 in the form of a microphone is furthermore arranged in particular in the area of the control panel 3 in interaction with the speech recognition software E. The microphone as well as an electronic camera 20, which is provided more preferably, is potentially directed towards the user of the food processor 1 in the control panel 3. The camera 20 serves to capture images, which can be evaluated, in combination with the face recognition software F and/or the gesture recognition software G.

In response to the speech recognition, preferably the spoken word, in particular the command word or the acoustic pressure resulting therefrom, respectively, is converted into electrical signals and is processed and analyzed by a digital signal processor. After the continuous analysis of the received words and the comparison with a previously defined word list within a control data bank $E_1$, the signal processor returns the word having the highest probability, which corresponds to the spoken word. In a further step, a microcontroller analyzes the word, which is present in text form, and translates it into a machine command or into a recipe or converts it, respectively, such that a recipe is accessed specifically from the recipe data bank 18 and is displayed at least on the display 11. In a preferred further development, the transmission of the machine command to the recipe data bank 18 has the result that the parameters, such as speed, temperature and time, which belong to the accessed recipe or recipe section, are preset automatically.

As an alternative to or also in combination with the speech recognition, an image is captured continuously by using the camera 20, which is provided in the control panel 3, in particular for face recognition, furthermore as an alternative thereto or in combination therewith for gesture recognition. If a user is located in a defined image section and at a defined distance in front of the food processor 1, the image is examined, the face is extracted in the event of a face recognition, and is compared to a previously generated face data bank $F_1$. The comparison with the face data bank $F_1$ is attained by means of a processor, which is integrated in the food processor, wherein the face data bank $F_1$ as well as the further data banks are preferably stored in a non-volatile memory.

If a face, which has been stored in the face data bank $F_1$ as reference value, is recognized via the face recognition F, this recognition can lead to the translation into a machine command or into a recipe for selection from the recipe data bank 18, as in the case of speech recognition.

If a gesture of the user is recognized via the camera 20, for example an up and down movement of a hand, wiping with the hand, etc., this can preferably lead to the same operating commands as described above with regard to the face recognition or speech recognition.

If a user is located in a defined image section and at a distance, the captured image is examined and the body of the user or body parts, respectively, such as face or hands, is extracted. If the body of the recognized person is in a stable position, the gesture recognition G it initiated. The movement of a hand, for example, is hereby observed and analyzed continuously. For recognition, the movement of a hand is determined by calculating movement vectors. The differential image calculation, in which an extracted feature (for example the hand) is determined initially in consecutive images, and the position of which is searched in the analyzed images, is suitable for this. If a movement corresponds to a previously defined gesture from the gesture data bank $G_1$, the function of the food processor 1, which is stored for this, is executed, for example the setting of one or a plurality of parameters, such as speed, temperature or time, in addition the selection of a certain recipe from the recipe data bank 18.

In a preferred embodiment, the respective recognition for controlling the food processor 1 preferably in a contact-free manner—which is preferably possible in addition to the common manual control of the food processor 1—initially requires the food processor 1 to be turned on, in particular the activation thereof, for example via a main switch. In the alternative, the activation of the food processor can be attained by means of a certain voice command and/or gesture command and/or by recognizing a certain face, if applicable. The food processor 1 can thus preferably only be activated as a whole by recognizing a provided signal word or a provided gesture, whereby signal word or gesture preferably differ greatly from common words of gestures.

The activation of the food processor 1 can be limited to certain persons by means of a face recognition.

Based on this activation in point A in FIG. 3, the food processor 1 can be operated optionally under point B, it can thus be operated manually in the conventional manner on the one hand, on the other hand in a contact-free manner as a result of gesture and/or face and/or speech recognition.

Due to a certain command word and/or a certain gesture and/or due to a facial image in the face data bank, which is associated with corresponding parameters, the parameters can be set manually (point C) after activation, thus in particular the speed $C_1$, the temperature $C_2$ and the duration $C_3$, and/or the recipe data bank can be accessed under point D. Depending on the command word, face or gesture, all functions are activated or are available only to a limited extent.

As can furthermore be seen from the flowchart in FIG. 3, the recipes D are divided in a wide variety of submenus, for instance initially under the generic terms "sauces" D1, "meat" D2 and "baked goods" D3 in the illustrated exemplary embodiment, wherein the latter term, in turn, is divided into "cakes" D3.1 and "bread" D3.2.

The menu item "bread" offers a submenu "rolls" D3.2.1, among others, which, in turn, is divided into "wheat rolls" D3.2.1.1 and "rye rolls" D3.2.1.2, for example.

The recipe data bank can be maneuvered, for example via the speech recognition E, thus in particular as a result of command words, which correspond to the individual menu items (for example "recipes", "baked goods", "bread", etc.).

In the alternative, a submenu can also be accessed directly via the speech recognition E, for example by means of the word "rolls", in response to which the submenu is then displayed directly in the display 11.

As a further alternative, the possible submenu items are specified acoustically as a result of a speech output, in response to which the user can react with the corresponding command word. If the command word corresponds directly to a submenu, which is not subdivided further, for example "rye rolls" in the illustrated exemplary embodiment, the corresponding recipe is accessed directly and the parameters for speed, temperature and time are set, if applicable.

The gesture recognition and the routine task of the food processor 1 resulting therefrom is equivalent to the above-described speech recognition. Different gestures, in particular with the hand, lead to routine tasks of the food processor 1, which correspond to the respective gesture, thus for example, to accessing a certain recipe or to setting possible special functions of the food processor, such as the cake batter setting, for example.

When a certain face is recognized, a selection of recipes culminating in one recipe can be provided as a function of the parameters, which belong to the reference face stored in the data bank.

Regardless of whether a gesture recognition, a face recognition or a speech recognition can be used or is used or also a combination thereof, it is more preferable for the registered command, which is to be converted, to initially be queried optically, for example, in the display 11 or acoustically by means of speech output. In the case of a speech recognition, the user can react to this with yes or no, for example.

In a preferred embodiment, the setting of speed $C_1$ and/or temperature $C_2$ by means of a gesture and/or a word command is only converted into a corresponding action, if the duration $C_3$ has furthermore also been set. This can take place manually. In addition, a query can also be made so as to ask the user to also input the duration.

In the case of a gesture recognition, speed, temperature and/or time can be set, for example by continuously moving the hand upwards or moving it downwards.

The above descriptions serve to explain the inventions, which are covered as a whole by the application, which further develop the state of the art at least by means of the following feature combinations, in each case independently, namely:

A food processor, which is characterized in that the food processor 1 encompasses a camera 20, in particular an electronic camera, which is potentially directed towards the user of the food processor 1, and that a face recognition software as well as a face data bank $F_1$ are stored and that face recognition F can be used to cause the food processor 1 to carry out a routine task.

A food processor, which is characterized in that the face recognition F activates the food processor 1.

A food processor, which is characterized in that the face recognition F activates a speech control E and/or gesture control G of the food processor 1.

A food processor, which is characterized in that the face recognition F is activated by turning on the food processor 1.

A food processor, which is characterized in that the face recognition F can be deactivated only by turning off the food processor 1.

A food processor, which is characterized in that a heating and/or a running of the mixer 5 is carried out only when speed $C_1$, temperature $C_2$ and duration $C_3$ are provided or are accepted in response to a corresponding suggestion from the food processor 1.

| LIST OF REFERENCE NUMERALS: | | | |
|---|---|---|---|
| 1 | food processor | A | activation |
| 2 | mixing bowl accommodation | B | selection |
| 3 | operating panel | C | parameter setting |
| 4 | mixing bowl | $C_1$ | speed |
| 5 | mixer | $C_2$ | temperature |
| 6 | electric motor | $C_3$ | duration |
| 7 | resistance heating | D | recipes |
| 8 | grab handle | D1 | sauces |
| 9 | bowl lid | D2 | meat |
| 10 | power cord | D3 | baked goods |
| 11 | display | D3.1 | cake |
| 12 | rotary switch | D3.2 | bread |
| 13 | push button | D3.2.1 | rolls |
| 14 | push button | D3.2.1.1 | wheat rolls |
| 15 | push button | D3.2.1.2 | rye rolls |
| 16 | push button | E | speech |

-continued

LIST OF REFERENCE NUMERALS:

| 17 | push button | | recognition |
| --- | --- | --- | --- |
| 18 | recipe data bank | $E_1$ | command data bank |
| 19 | acoustic transducer | F | face recognition |
| 20 | camera | $F_1$ | face data bank |
| | | G | gesture recognition |
| | | $G_1$ | gesture data bank |

The invention claimed is:

1. An electrically operated food processor with:
a mixing bowl;
a mixer in the mixing bowl;
a camera configured to be directed towards a user of the food processor;
an acoustic transducer; and
a computer comprising a computer processor, having a face recognition software and a face data bank both stored on the computer, and configured to receive images captured by the camera and an audio signal from a spoken word captured by the acoustic transducer; and
wherein at least one of a speech control software and a gesture control software is further stored on the computer;
wherein the face recognition software is programmed to use an image captured by the camera and the face data bank to perform face recognition;
wherein the computer processor is programmed to activate at least one of the speech control software and the gesture control software when a positive face recognition is achieved via the face recognition, the speech control software performing speech recognition using the audio signal and/or the gesture control software performing gesture recognition using a plurality of images captured by the camera; and
wherein the computer processor is programmed to cause the food processor to operate when a positive speech recognition is achieved via the speech recognition or when a positive gesture recognition is achieved via the gesture recognition.

2. The food processor according to claim 1, wherein the computer processor is programmed to activate the food processor when the positive speech recognition is achieved via the speech control software or when the positive gesture recognition is achieved via the gesture control software.

3. The food processor according to claim 1, wherein the food processor is configured so that turning on the food processor activates the computer, the camera, and the face recognition software.

4. The food processor according to claim 1, wherein the face recognition software can be deactivated only by turning off the food processor.

5. The food processor according to claim 1, further comprising a display configured to display a suggestion from the food processor;
wherein a heating and/or a running of the mixer is carried out only when speed, temperature and duration of the suggestion are accepted by the user via a voice command captured by the acoustic transducer and processed via the speech control software.

6. The food processor according to claim 1, further comprising a display configured to display a suggestion from the food processor;
wherein a heating and/or a running of the mixer is carried out only when speed, temperature and duration of the suggestion are accepted by the user via a gesture captured by the camera in the plurality of images and processed via the gesture control software.

7. The food processor according to claim 1, further comprising:
a display configured to display a suggestion from the food processor; and
an input device selected from the group consisting of a button and a switch;
wherein a heating and/or a running of the mixer is carried out only when speed, temperature and duration of the suggestion are accepted by the user via an input into the input device.

8. A food processing system comprising:
an electrically operated food processor with:
a mixing bowl;
a mixer in the mixing bowl;
a camera configured to be directed towards a user of the food processor;
an acoustic transducer; and
a first computer comprising a first computer processor and configured to receive images captured by the camera and to receive an audio signal from a spoken word captured by the acoustic transducer; and
a second computer comprising a second computer processor, the second computer being located externally to the electrically operated food processor, wherein a face recognition software, a face data bank, and at least one of a speech control software and a gesture control software are stored on the second computer;
wherein the first computer is configured to transmit a first image captured by the camera and the audio signal to the second computer;
wherein the second computer processor is configured to use the face recognition software, the first image, and the face data bank to perform face recognition;
wherein the second computer is configured to transmit a positive face recognition signal to the first computer when the face recognition achieves a positive face recognition;
wherein the first computer is programmed so that when a positive face recognition signal is received by the first computer, the first computer causes the acoustic transducer to capture the spoken word or causes the camera to capture a plurality of images, and the first computer transmits the audio signal or the plurality of images to the second computer;
wherein the second computer is programmed to activate the speech control software or the gesture control software when the second computer receives the audio signal or the plurality of images from the first computer, respectively, and the speech control software performs speech recognition using the audio signal or the gesture control software performs gesture recognition using the plurality of images; and
wherein when the speech recognition at the second computer achieves a positive speech recognition or when the gesture recognition at the second computer achieves a positive gesture recognition, the second computer sends an activation signal to the first computer, and the first computer processor is programmed to cause the food processor to operate when the first computer receives the activation signal.

9. The food processing system according to claim 8, wherein the first computer processor is programmed to activate the food processor when the first computer receives the activation signal.

10. The food processing system according to claim 8, wherein the food processor is configured so that turning on the food processor activates the first computer, the camera, and the second computer.

11. The food processing system according to claim 8, wherein the face recognition software can be deactivated only by turning off the food processor.

12. The food processing system according to claim 8, further comprising a display configured to display a suggestion from the food processor;

wherein a heating and/or a running of the mixer is carried out only when speed, temperature and duration of the suggestion are accepted by the user via a voice command captured by the acoustic transducer and processed via the speech control software.

13. The food processing system according to claim 8, further comprising a display configured to display a suggestion from the food processor;

wherein a heating and/or a running of the mixer is carried out only when speed, temperature and duration of the suggestion are accepted by the user via a gesture captured by the camera and processed via the gesture control software.

14. The food processing system according to claim 8, further comprising:

a display configured to display a suggestion from the food processor; and an input device selected from the group consisting of a button and a switch;

wherein a heating and/or a running of the mixer is carried out only when speed, temperature and duration of the suggestion are accepted by the user via an input into the input device.

15. A food processing system comprising:

an electrically operated food processor with:
   a mixing bowl;
   a mixer in the mixing bowl;
   a camera configured to be directed towards a user of the food processor;
   an acoustic transducer; and
   a computer comprising a computer processor and a memory input receiving device, wherein the computer is configured to receive an image captured by the camera and to receive an audio signal from a spoken word captured by the acoustic transducer; and a memory storage device configured to be inserted into the memory input receiving device, wherein a face recognition software and a face data bank and at least one of a speech control software and a gesture control software are stored on the memory storage device;

wherein the face recognition software is programmed to use the image captured by the camera and the face data bank to perform face recognition, and the computer processor is configured to execute the face recognition software when the memory storage device is inserted into the memory input receiving device of the computer;

wherein the computer processor is programmed to execute at least one of the speech control software and the gesture control software when a positive face recognition is achieved via the face recognition software, the speech control software performing speech recognition using the audio signal and/or the gesture control software performing gesture recognition using a plurality of images captured by the camera; and wherein the computer processor is programmed to cause the food processor to operate when a positive speech recognition is achieved via the speech recognition or when a positive gesture recognition is achieved via the gesture recognition.

16. The food processing system according to claim 15, wherein the memory storage device is a USB flash drive.

\* \* \* \* \*